United States Patent [19]

Johnson

[11] Patent Number: 4,648,831
[45] Date of Patent: Mar. 10, 1987

[54] BLOW MOLDING APPARATUS
[75] Inventor: Eric C. Johnson, Saline, Mich.
[73] Assignee: Owens-Illinois, Inc., Toledo, Ohio
[21] Appl. No.: 594,073
[22] Filed: Mar. 28, 1984
[51] Int. Cl.[4] .............................................. B29C 49/56
[52] U.S. Cl. .................................. 425/540; 425/451.4; 425/541
[58] Field of Search ............... 425/532, 539, 540, 541, 425/451, 451.4, 451.5, 451.9, 188; 264/543

[56] References Cited
U.S. PATENT DOCUMENTS

| | | | |
|---|---|---|---|
| 3,020,595 | 2/1962 | Szajna | 249/79 |
| 3,025,561 | 3/1962 | Ruekberg et al. | 425/540 |
| 3,390,430 | 7/1968 | Lynch et al. | 425/532 |
| 3,496,599 | 2/1970 | Brown | 425/540 |
| 3,537,134 | 11/1970 | Raper et al. | 425/532 |
| 3,543,339 | 12/1970 | Stefaniak | 425/540 |
| 3,585,682 | 6/1971 | Martelli | 425/532 |
| 3,669,595 | 6/1972 | Zippel et al. | 425/451.5 |
| 3,718,416 | 2/1973 | Shelby | 425/540 |
| 3,767,345 | 10/1973 | Doughty et al. | 425/532 |
| 3,785,761 | 1/1974 | Logomasini et al. | 425/540 |
| 3,918,872 | 11/1975 | Logomasini et al. | 425/451 |

Primary Examiner—Barry S. Richman
Assistant Examiner—Joye L. Woodard
Attorney, Agent, or Firm—Philip M. Rice

[57] ABSTRACT

A blow molding apparatus wherein a plurality of circumferentially spaced sets of molds are provided for rotation about a horizontal axis and plastic material is extruded in tubular form between the mold sections of each set of molds and the molds are closed and the portion of the plastic within each mold section is blown to form a hollow article, a slide assembly for mounting the radially outermost mold section of each set of molds comprising a base, a slide on the base providing a mold support for one mold section and adapted to move radially toward and away from the other mold section associated with the section supported by the slide, a cam follower slidable upon the base and linkage between the cam follower and the slide operable to provide a rapid movement of the mold support radially inwardly and radially outwardly as the cam follower follows an annular cam in the machine.

12 Claims, 10 Drawing Figures

FIG. 10 ted States Patent

BLOW MOLDING APPARATUS

This invention relates to blow molding machines and particularly to blow molding machines of the wheel type.

BACKGROUND AND SUMMARY OF THE INVENTION

In blow molding machines of the wheel type, a wheel supports a plurality of circumferentially spaced sets of molds and is generally rotated about a horizontal axis. Plastic tubing is continuously extruded downwardly between the open mold sections and then the molds are closed as they move about an annular path and the portion of the tubing within the molds is blown within the confines of the mold to provide a hollow article which is a container.

One of the problems with respect to such mechanisms is that the molds are moved to open and closed positions by cams and the space requirements are such that it is difficult to rapidly open and close the molds sufficiently to provide the desired space for extruding the plastic material and for removing the articles which have been formed.

Accordingly, among the objectives of the present invention are to provide a slide assembly which will rapidly open and close the molds within the limited confines thereby providing sufficient opening without interfering with the other mechanism.

In accordance with the invention, in a blow molding apparatus wherein a plurality of circumferentially spaced sets of molds are provided for rotation about a horizontal axis and plastic material is extruded in tubular form between the mold sections of each set of molds and the molds are closed and the portion of the plastic within each mold section is blown to form a hollow article, a slide assembly is provided for mounting the radially outermost mold section of each set of molds and comprises a base, a slide on said base providing a support for one mold section and adapted to move radially toward and away from the other mold section associated with the section supported by the slide, a cam follower slidable upon the base, and linkage means between the cam follower and the slide operable to provide a rapid movement of the mold support radially inwardly and radially outwardly as the cam follower follows an annular cam in the machine.

DESCRIPTION

Figure 1:
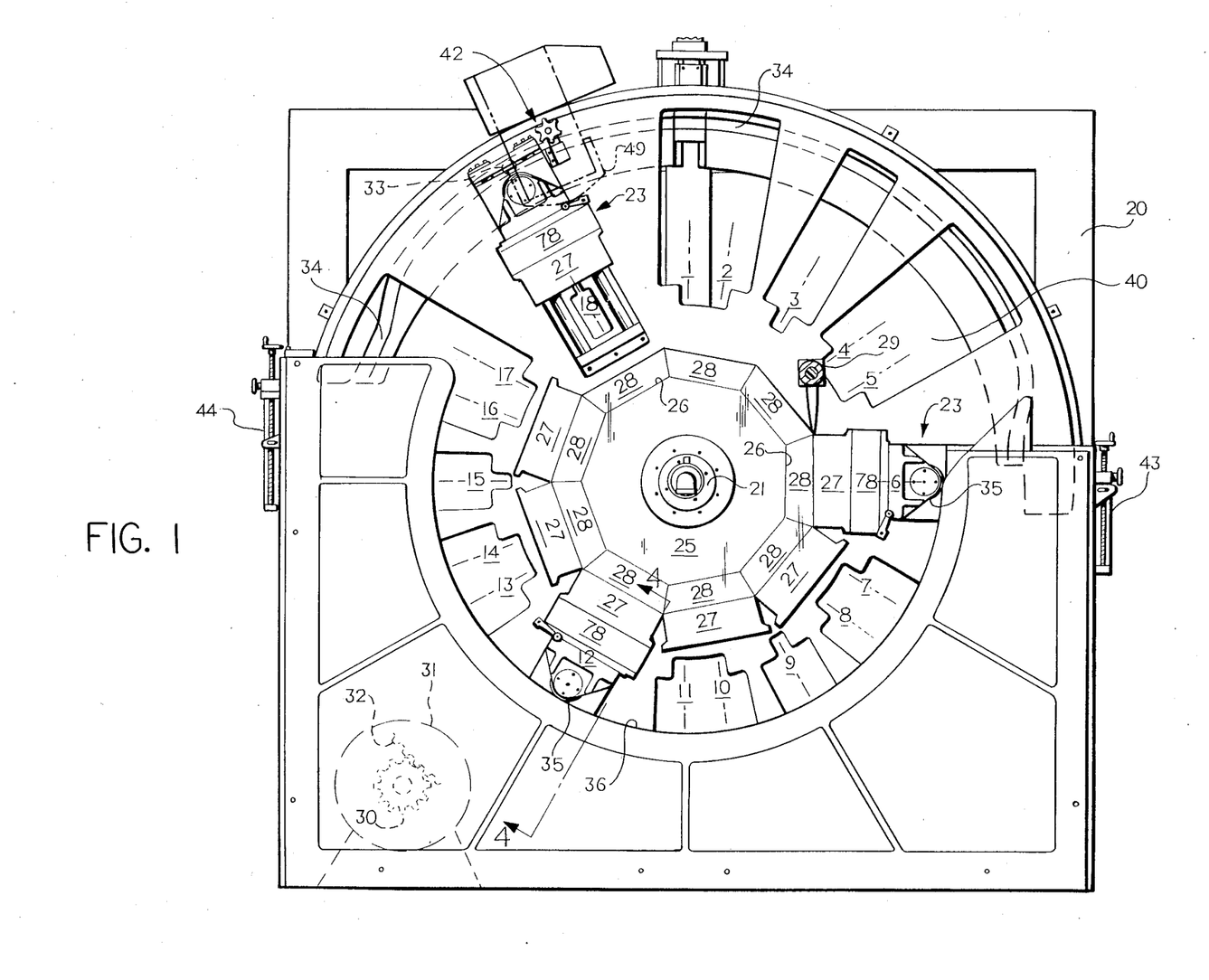
FIG. 1 is a front elevational view of a blow molding apparatus embodying the invention, parts being broken away.

Referring to FIG. 1, the blow molding apparatus embodying the invention comprises a frame 20 in which a shaft 21 is mounted for rotation about a horizontal axis. A wheel plate 22 is mounted on the shaft 21 for rotation with the shaft 21 and supports a plurality of circumferentially spaced slide assemblies 23. A hub 25 is also mounted on the shaft for rotation with the shaft and has a plurality of circumferentially spaced mold supporting surfaces 26 corresponding in number to the number of slide assemblies 23.

Each slide assembly 23 supports a first section or part 27 of mold and the corresponding surface 26 of the hub 25 supports the second section 28 of a mold. Each slide assembly 23 is adapted to move the mold section 27 toward and away from the other mold section 28 to close about a heated parison emanating from an extruder head 29 so that the parison can be blown to the shape of the mold cavity defined by the mold sections 27, 28 as the wheel rotates. The parison is provided from the head 29 of an extruder in the two o'clock position as shown in FIG. 1.

Wheel plate 22 is rotated by a gear 30 driven by a motor 31 and meshing with a gear 32 on the periphery of the wheel plate. Each slide assembly 23 includes a cam follower 33 which engages a fixed arcuate cam 34 on the frame 20 to move mold section 27 toward and away from mold section 28. A second cam follower 35 on each slide assembly 23 engages a second fixed cam 36 on frame 20 to hold the mold sections 27, 28 in closed position. Second cam 36 extends generally from the three o'clock position to the nine o'clock position.

An air valve 42 is provided on each slide assembly 23 and is actuated by an actuator 43 along the path of the molds that functions to turn the blow air on for blowing the article and another actuator 44 is provided along the path to function to turn the air valve 42 off cutting off the flow to the blowing apparatus.

In operation, the plastic material is continuously extruded from the head 29 of the extruder and flows downwardly between the mold sections 27, 28. As the wheel plate continues to rotate, the mold sections 27, 28 are brought together pinching the plastic material and air is supplied to the interior of the tubular parison to blow the article in a manner well known in the art. As the article reaches the position when the blow mold is open (twelve o'clock position as viewed in FIG. 1) an ejector ejects the articles onto a conveyor.

Referring to FIGS. 4 thru 9, each slide assembly 23 comprises a base 50 that is fastened to the wheel plate 22 by bolts 51 and supports spaced rods or shafts 52 which extend radially with respect to the wheel 22 and support a slide 53 for reciprocating movement on the shafts 52. Each slide 53 is adapted to support the mold section 27 and the cam follower 35 which is in the form of a wheel rotatably mounted about an axis parallel to the axis of rotation of the wheel plate 22.

Figure 7:
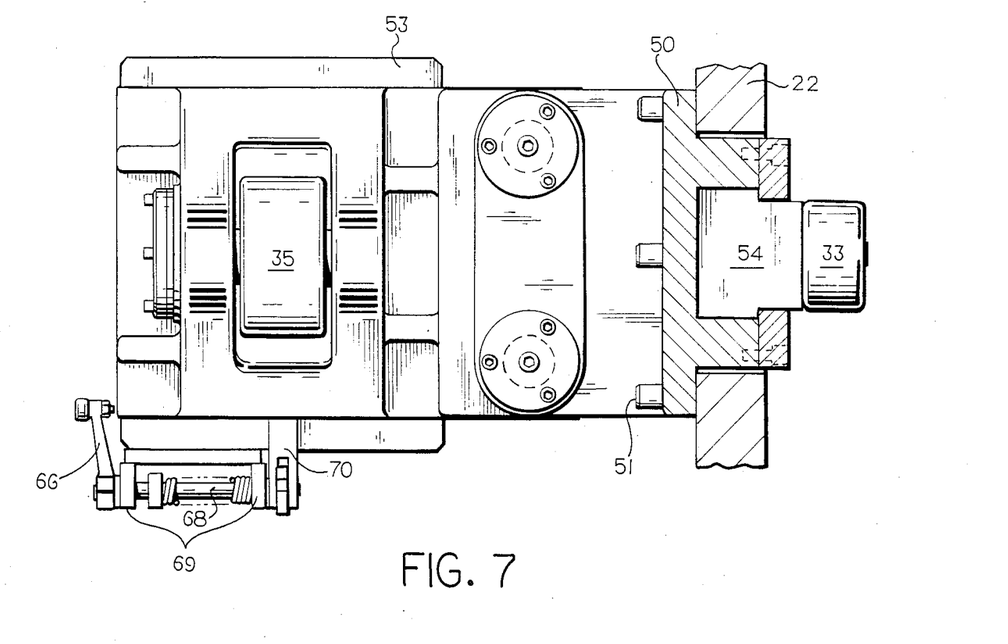
FIG. 7 is a bottom plan view of the apparatus taken along the line 7—7 in FIG. 4, parts being broken away.

As shown in FIG. 7, cam follower 33 is rotatably mounted on a secondary slide 54 mounted for radial movement in a slideway 55 on a portion of the base 50 which extends through an opening 40 or 41 in the wheel plate 22. This functions to minimize the required diameter of wheel plate 22.

A linkage is interposed between the cam follower 33 and the slide 53 for rapidly moving the slide 53 and, in turn, the mold section 27, radially inwardly and outwardly as the cam follower 33 follows the cam 34 in order that the mold sections will quickly open sufficiently for introduction of the parison and removal of the formed article and sufficiently to rapidly close about the parison after the parison is introduced between the mold sections.

Figure 8:
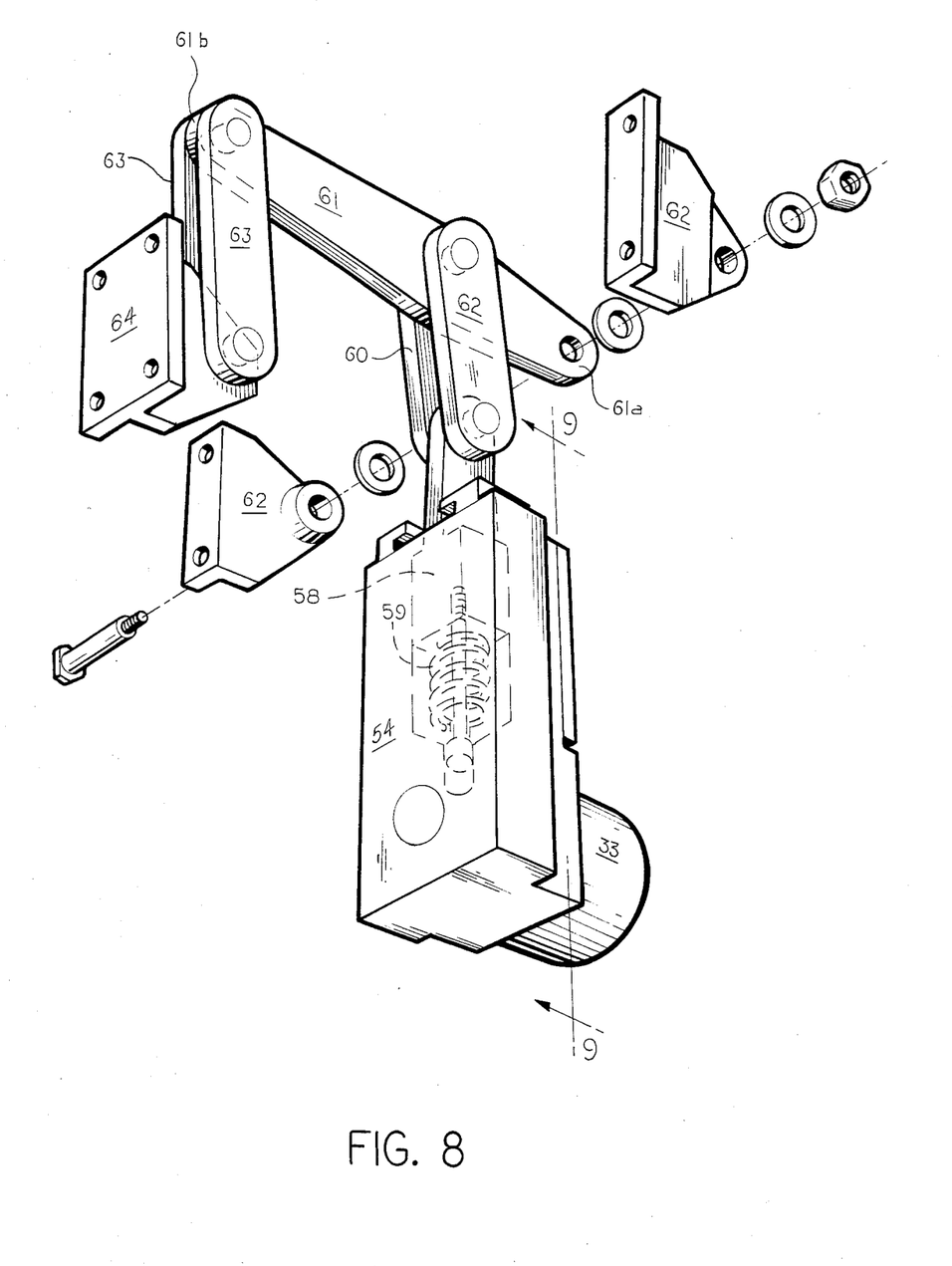
FIG. 8 is an exploded perspective view of a portion of the apparatus.
Figure 9:
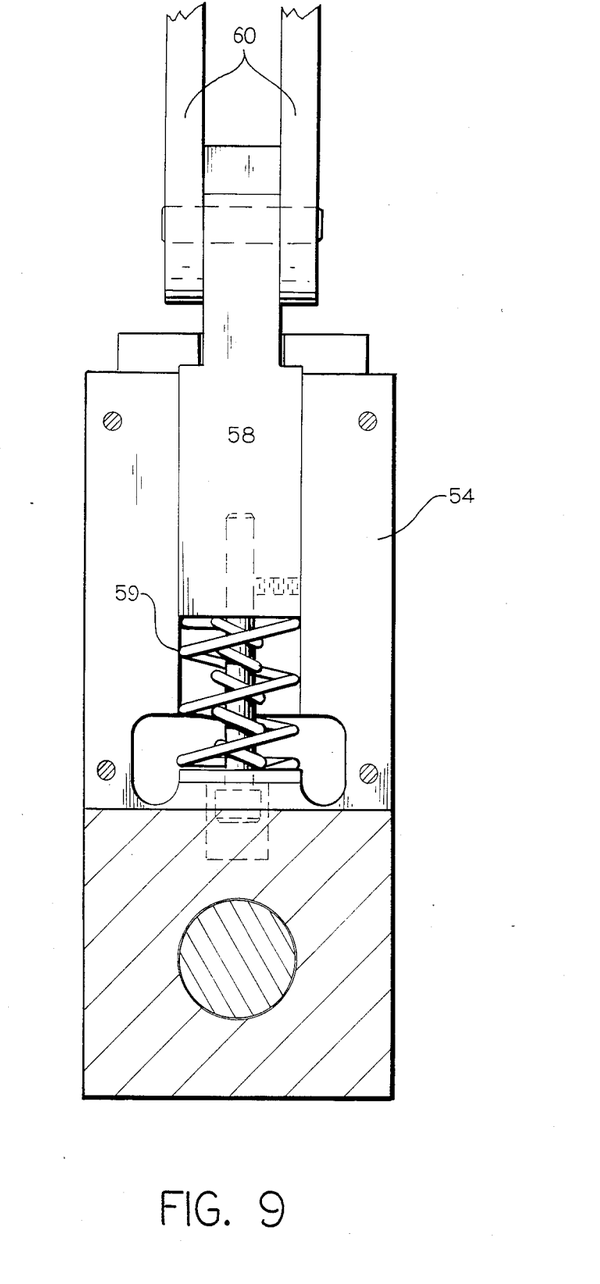
FIG. 9 is a sectional view taken along the line 9—9 in FIG. 8.

As shown particularly in FIG. 8, the linkage comprises a member 58 mounted for limited movement in secondary slide 54 for shock absorption against springs 59, a pair of links 60 pivoted to member 58 at one end and to a lever 61 at the other end intermediate the ends of lever 61. One end 61a of lever 61 is pivoted to brackets 62 on base 50 and the other end 61b is connected by link 63 to a bracket 64 fastened to the slide 53. The pivot joint of links 60 to lever 61 is such that the lever arm to links 63 is greater than the lever arm to bracket 62. As a result there is a multiplication of the movement from cam follower 33 to slide 53.

Figure 4:
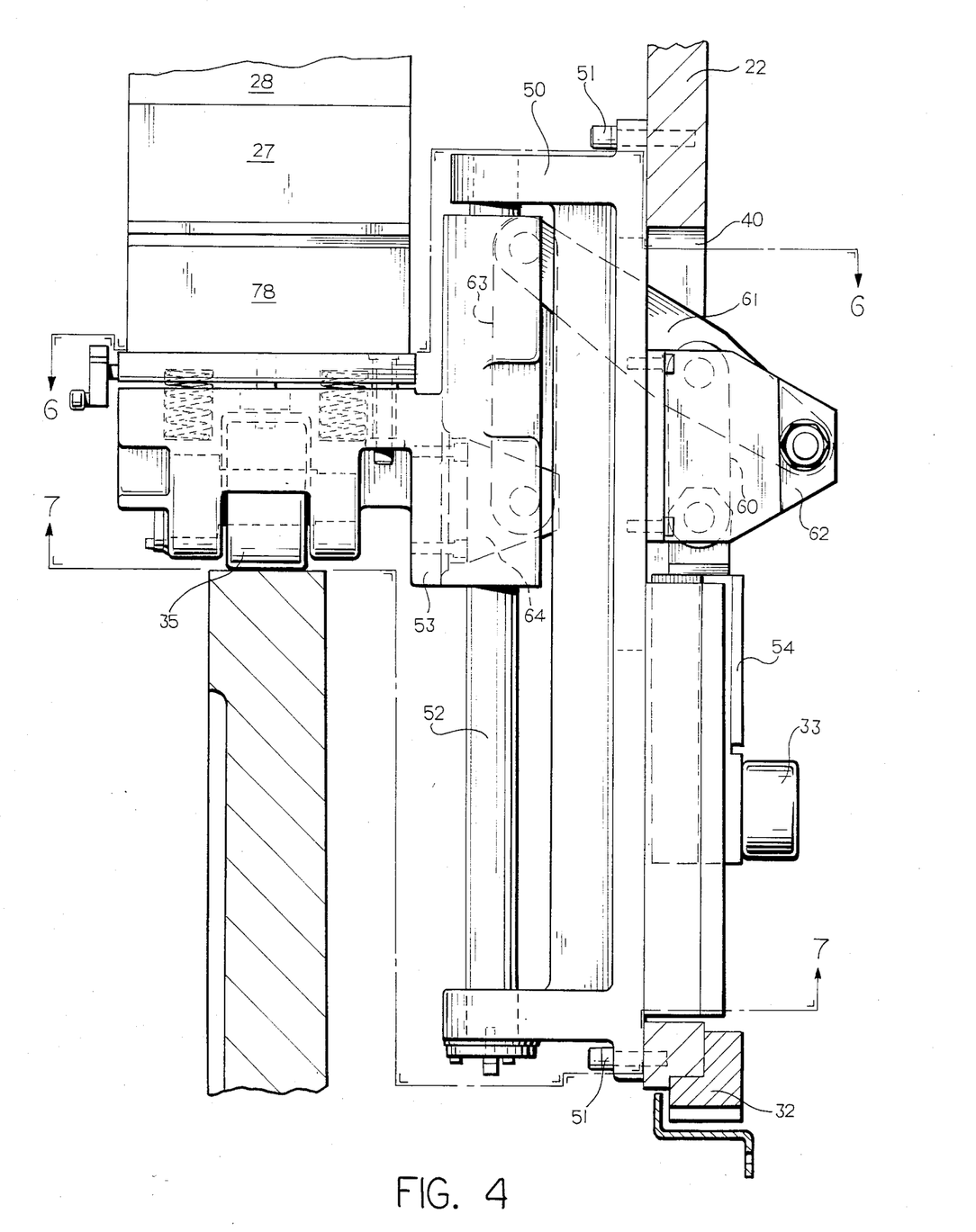
FIG. 4 is a fragmentary part sectional side elevational view of a portion of the apparatus shown in FIG. 3.
Figure 5:
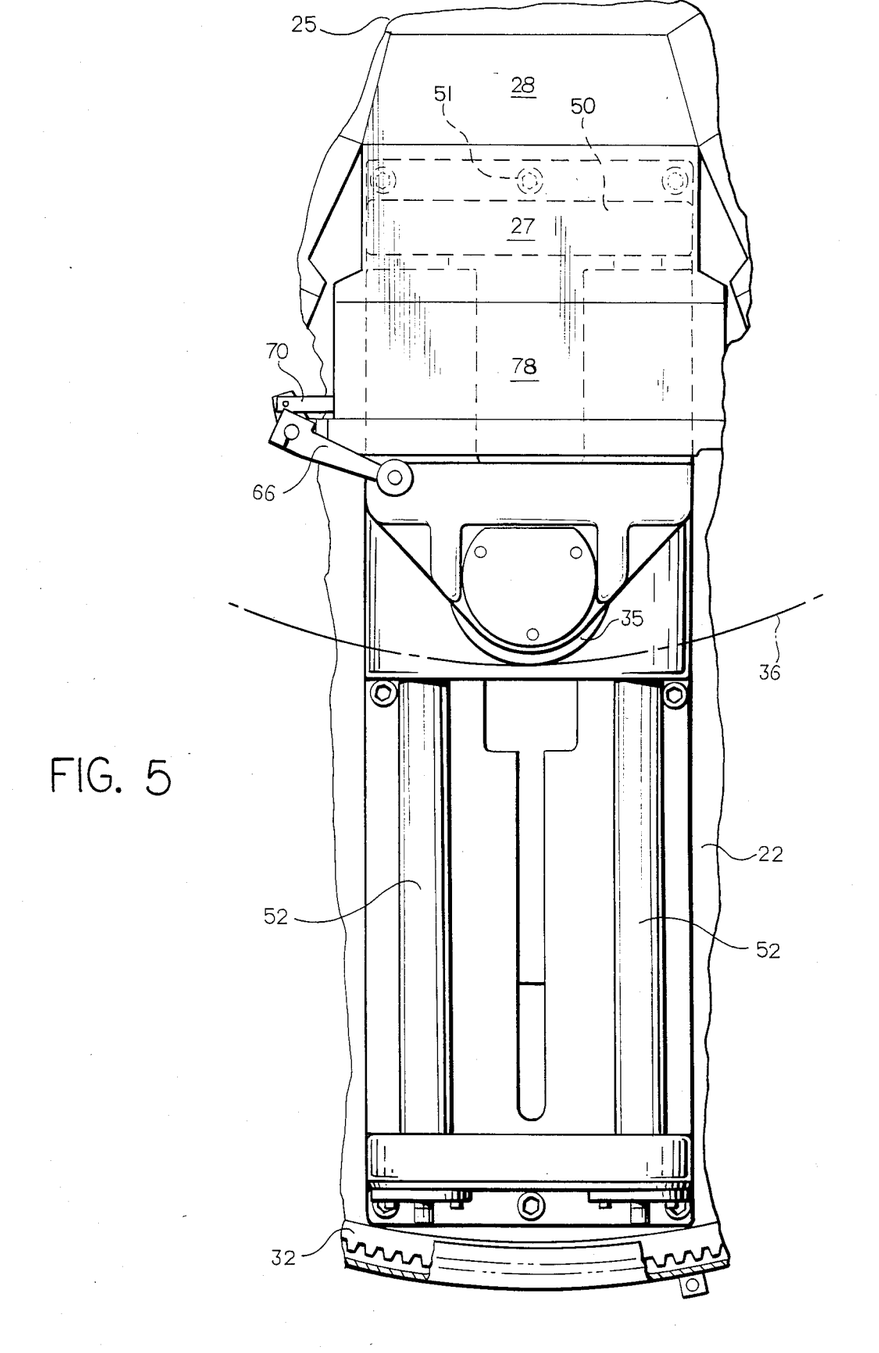
FIG. 5 is a fragmentary rear elevational view of a portion of the apparatus shown in FIG. 3.
Figure 6:
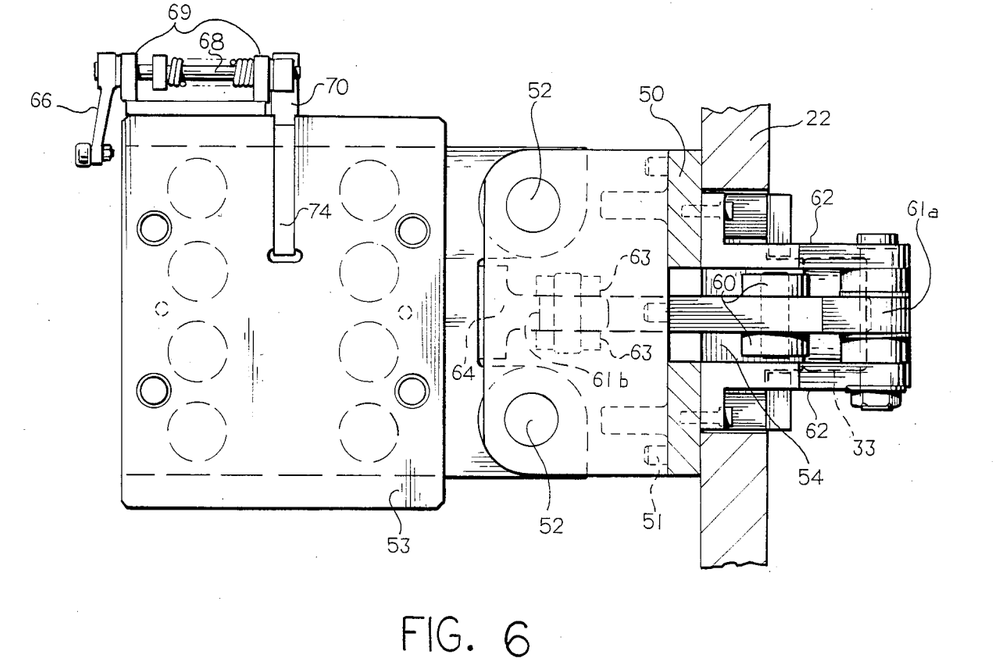
FIG. 6 is a top plan view of the apparatus taken along the line 6—6 in FIG. 4, parts being broken away.

As shown in FIG. 4, when the mold sections are closed, the linkage assumes the relationship as shown wherein the lever 61 has its end 61b which is pivoted to the links 63 positioned so that it is radially inwardly with respect to the other end 61a pivoted to the brackets 62 on the slide 53. When the slide is moved radially outwardly to open the molds, the lever 61 assumes a position wherein the end 61b is radially outwardly with respect to the end 61a. This relative relationship caused by movement of the secondary slide 54 on which the roller 33 is mounted multiplies the movement and thereby produces a rapid movement of the slide 53 on which the mold section 27 is mounted as contrasted to the movement of the slide 54 on which the cam roller 33 is mounted resulting in a quick opening and closing of the mold section.

The provision of the shock mounting of cam follower 33 functions to absorb the shock that might occur when the slide 53 and associated mold 27 are moved between control by one of the cams 34, 36 or the other of the cams where the cams 34, 36 overlap at the closing and opening of the mold sections.

Figure 2:
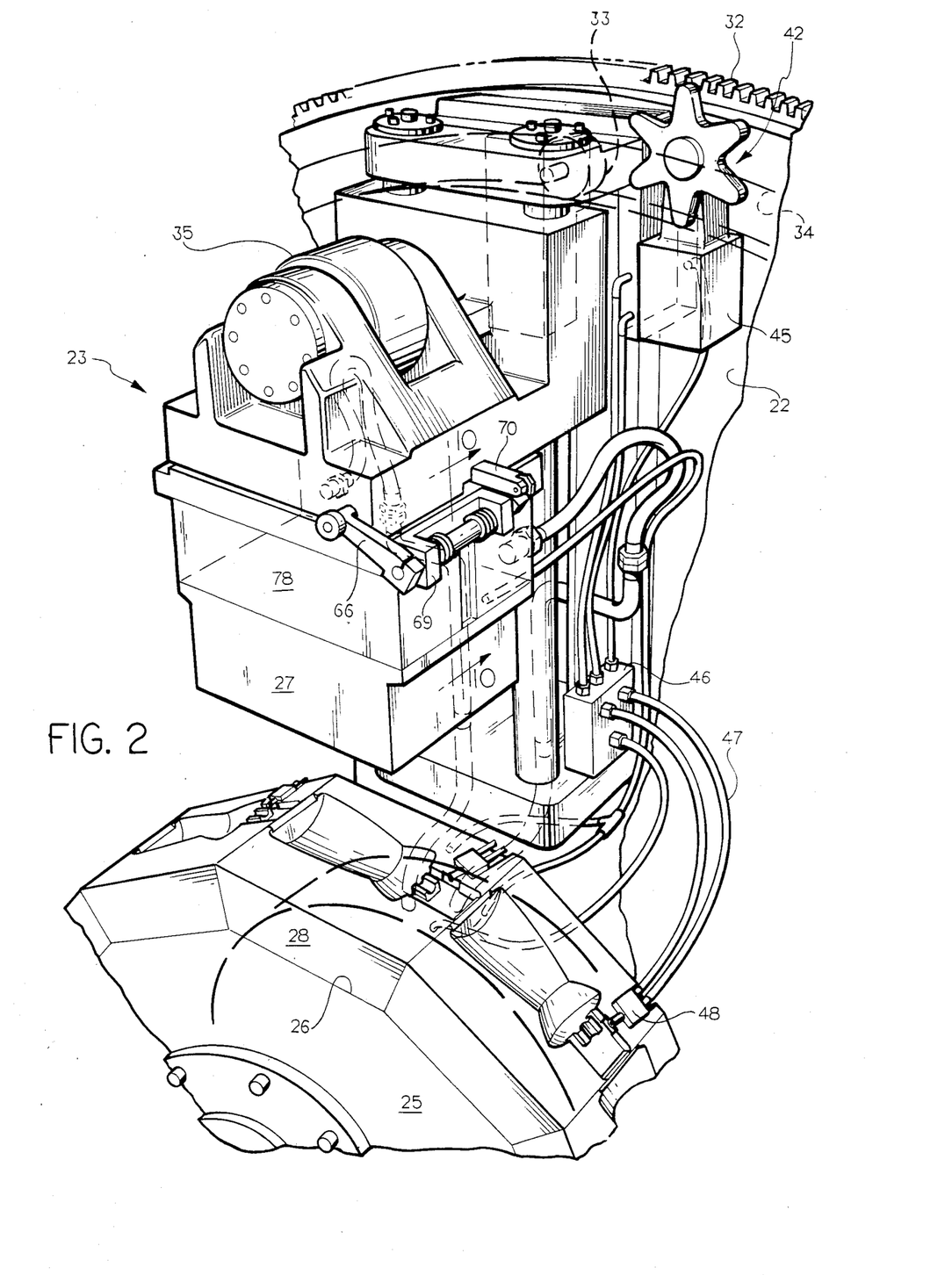
FIG. 2 is a fragmentary perspective view on an enlarged scale of a portion of the apparatus.
Figure 3:
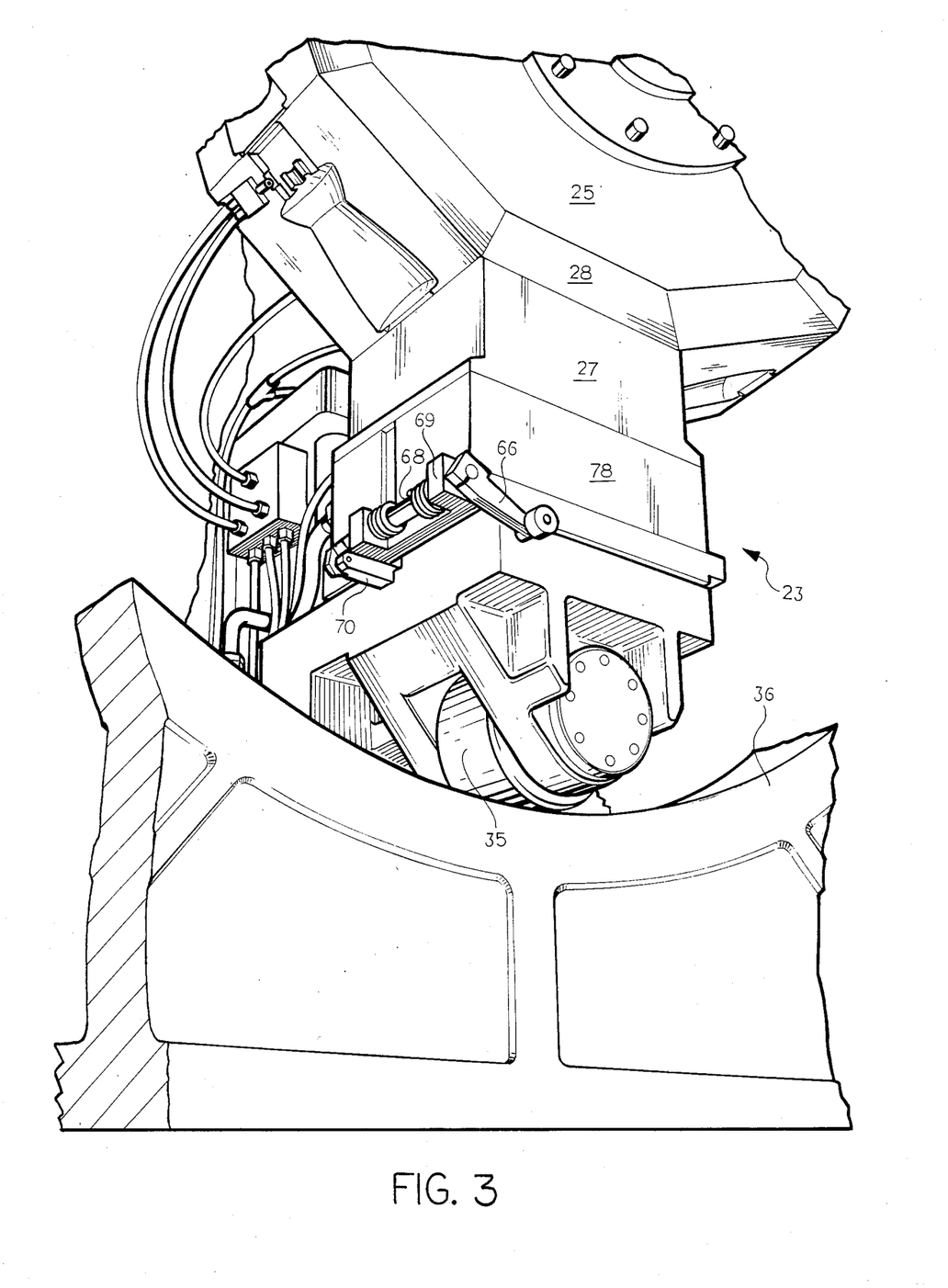
FIG. 3 is a fragmentary perspective view of a portion of the apparatus shown in FIG. 2 in another position.
Figure 10:
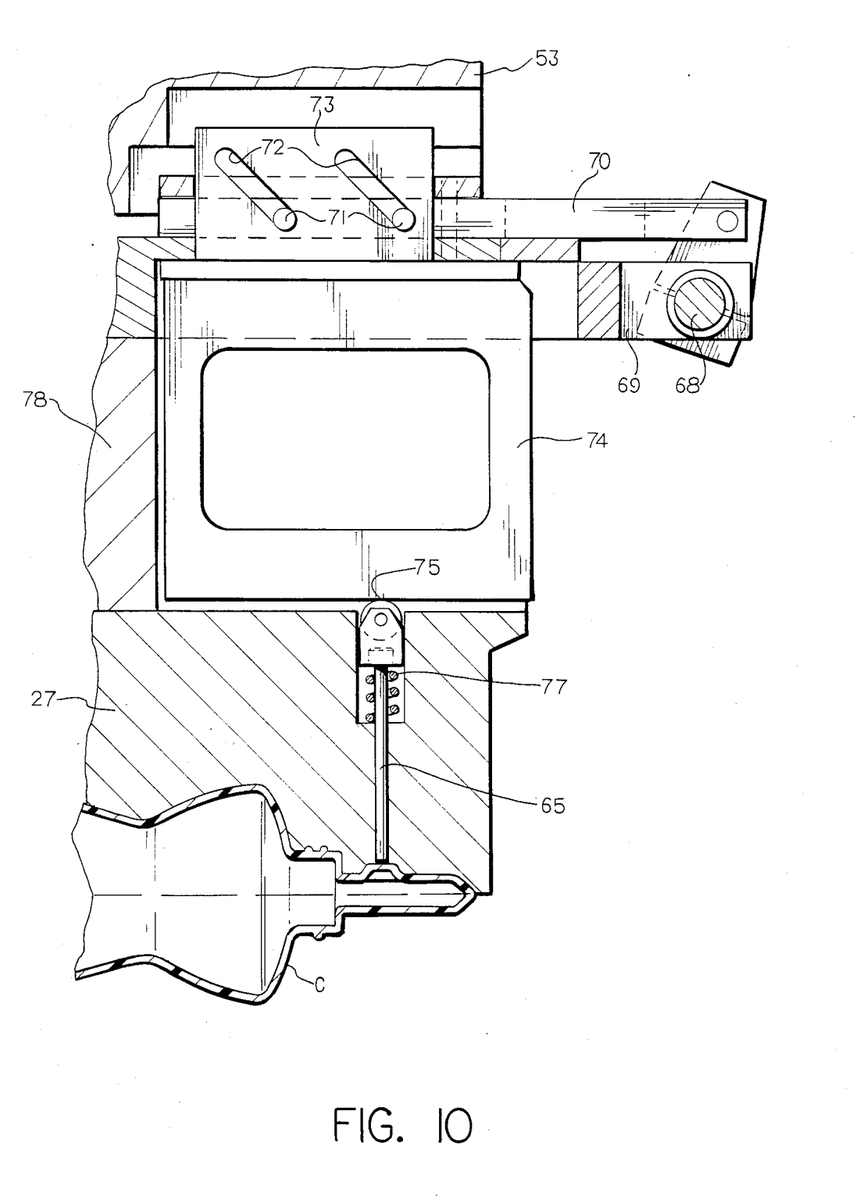
FIG. 10 is a sectional view taken along the line 10—10 in FIG. 2.

Referring to FIG. 10, each mold 27 has a knockout pin 65 which is operable to eject the molded container C when the mold is opened. The pin 65 is actuated by a knock-out mechanism that includes a lever 66 (FIG. 2) that is moved by a stationary member 49 in the path of the lever 66 to pivot shaft 68 journalled on brackets 69 and reciprocate a bar 70. Bar 70 includes pins 71 which extend into slots 72 of a radial slide 72 on slide 53 such that reciprocation of the bar 70 causes the slide 73 to move radially. The operation of the slide 73 functions to move the knock-out pin 65 through a spacer 74 that engages a roller 75 on the pin 65. A spring 77 yieldingly urges the pin 65 outwardly with respect to the mold cavity. Spacer 74 functions to span the space between slide 72 and roller 75 where a spacer block 78 is used between the slide 53 and the mold 27. A helical spring 79 normally urges lever 66, shaft 67 and slide 73 in a position where the slide 73 and spacer 74 permit the pin 65 to be retracted out of the mold cavity.

I claim:

1. In a blow molding apparatus wherein a plurality of circumferentially spaced sets of molds are mounted on a wheel plate for rotation about a horizontal axis and plastic material is extruded in tubular form between the mold sections of each set of molds and the molds are closed and the portion of the plastic within each mold section is blown to form a hollow article, wherein each set of molds includes a movable mold section and a fixed mold section, wherein the improvement comprises a slide assembly for mounting the movable mold section of each set of molds, said slide assembly comprising:

a base, mounted on said wheel plate, a slide on said base supporting said movable mold section and movable radially inwardly toward and radially outwardly away from said fixed mold section, a cam follower slidable radially upon said base, and linkage means between the cam follower and the slide operable to move the slide and, in turn, the movable mold section mounted thereon in a radial direction at a multiple of the radial movement of the cam follower to provide a rapid movement of the movable mold section radially inwardly and radially outwardly as the cam follower follows an arcuate cam on the apparatus.

2. The blow molding apparatus set forth in claim 1 wherein said linkage means comprises a lever pivoted at one end to said base, and at the other end to said slide, a link pivoted at one end to said cam follower and at the other end to said lever intermediate its ends such that as the cam follower moves radially inwardly and radially outwardly, the slide is moved rapidly along the base.

3. The blow molding apparatus set forth in claim 2 wherein said slide assembly further comprises a second cam roller rotatably mounted on said slide and adapted to engage a second arcuate cam on said blow molding apparatus for applying a radially inwardly extending compressive force on said movable mold section when the movable mold section is in the radially innermost position.

4. A blow molding apparatus comprising
a wheel plate,
a shaft,
means for supporting said wheel plate on said shaft for rotation about a horizontal axis,
a hub mounted on said wheel plate for rotation with said wheel plate,
a plurality of sets of molds defining a mold cavity when closed,
each said set including a movable mold section and a fixed mold section,
said fixed mold section of each said set being mounted on said hub on one side of said wheel plate such that said fixed mold sections are circumferentially spaced about said hub,
said movable mold section of each said set being mounted on said wheel plate in circumferentially spaced relation and radial alignment with said associated fixed mold section of each set,
means mounting each said movable mold section adjacent said one side of said wheel plate for movement toward and away from said associated fixed mold section of each set,
means interconnecting each said cam follower and its respective movable mold section,
each said mounting means including a cam follower,
an arcuated cam mounted adjacent the other side of said wheel plate for engaging said cam follower and moving said movable mold sections radially toward and away from said fixed mold sections as they are rotated with respect to said cam, said wheel plate having an opening therethrough for each said cam follower through which each cam follower extends into engagement with said cam.

5. The blow molding apparatus set forth in claim 4 wherein said mounting means includes a second cam follower and a second arcuate cam for holding said movable mold sections in closed position.

6. The blow molding apparatus set forth in claim 4 wherein said means mounting each said movable mold section comprises:
   a base, mounted on said wheel plate,
   a slide on said base supporting said movable mold section and movable radially inwardly toward and radially outwardly away from the associated mold section of each said set,
   said cam follower being slidable upon said base,
   and linkage means between the cam follower and the slide operable to move the slide and, in turn, the movable mold section mounted thereon in a radial direction at a multiple of the radial movement of the cam follower to provide a rapid movement of the slide radially inwardly and radially outwardly as the cam follower follows said arcuate cam on the apparatus.

7. The blow molding apparatus set forth in claim 6 wherein said linkage means comprises a lever pivoted at one end to said base, and at the other end to said slide,
   a link pivoted at one end to said cam follower and at the other end to said lever intermediate its ends such that as the cam follower moves radially inwardly and radially outwardly, the slide is moved rapidly along the base.

8. The blow molding apparatus set forth in claim 7 including a second cam roller rotatably mounted on said slide and adapted to engage an arcuate cam on said blow molding machine for applying a radially inwardly extending compressive force on said movable mold section when the movable mold section is in the radially innermost position.

9. In a blow molding apparatus wherein a plurality of circumferentially spaced sets of molds are mounted on a wheel plate for rotation about a horizontal axis and plastic material is extruded in tubular form between the mold sections of each set of molds and the molds are closed and the portion of the plastic within each mold section is blown to form a hollow article, wherein each set of molds includes a radially outermost movable mold section and a fixed mold section, wherein the improvement comprises a slide assembly for mounting the radially outermost movable mold section of each set of molds, said slide assembly comprising:
   a base mounted on said wheel plate,
   a slide on said base supporting said movable mold section for radial movement inwardly toward and outwardly away from said fixed mold section,
   a cam follower slidable radially upon said base and adapted to follow an annular cam,
   and linkage means between the cam follower and the slide operable to move the slide and, in turn, the movable mold section mounted thereon in a radial direction at a multiple of the radial movement of the cam follower to provide a rapid movement of the movable mold section radially inwardly and radially outwardly as the cam follower follows an arcuate cam on the apparatus, said linkage means between the cam follower and the slide comprising:
   a secondary slide mounted on side base for radial movement on said base,
   said cam follower being mounted on said secondary slide,
   a lever having one end pivoted to said base,
   a first link interconnecting said secondary slide and said lever intermediate its ends,
   and a second link pivoting the other end of said lever to said slide.

10. The blow molding apparatus set forth in claim 9 wherein said slide assembly further comprises shock absorbing means between said cam follower and said secondary slide.

11. A blow molding apparatus comprising:
    a wheel plate;
    a shaft;
    means for supporting said wheel plate on said shaft for rotation about a horizontal axis;
    a hub mounted on said wheel plate for rotation with said wheel plate;
    a plurality of sets of molds defining a mold cavity when closed;
    each said set comprising a movable mold section and a fixed mold section;
    said fixed mold sections of each said set being mounted on said hub on one side of said wheel plate such that said fixed mold sections are circumferentially spaced about said hub;
    said movable mold section of each said set being mounted on said wheel plate in circumferentially spaced relation and radial alignment with said associated fixed mold section of each set;
    means mounting each said movable mold section adjacent said one side of said wheel plate for movement toward and away from said associated fixed mold section of each set;
    a cam follower;
    an arcuate cam mounted adjacent the other side of said wheel plate for engaging said cam follower and moving said movable mold sections radially toward and away from said fixed mold sections as they are rotated with respect to the cam;
    said means mounting each said movable mold section comprising:
    a base mounted on said one side of said wheel plate,
    a slide on said base supporting said movable mold section and adapted to move radially inwardly toward and radially outwardly away from the fixed mold section associated with the movable mold section supported by the slide;
    said wheel plate having an opening for each said cam follower through which each cam follower extends into engagement with said arcuate cam;
    linkage means between the cam follower and the slide operable to move the slide and, in turn, the movable mold section mounted thereon in a radial direction at a multiple of the radial movement of the cam follower to provide a rapid movement of the movable mold section radially inwardly and radially outwardly as the cam follower follows an arcuate cam on the apparatus;
    said linkage means between the cam follower and the slide comprising:
    a secondary slide on said base,
    said cam follower mounted on said secondary slide,
    a lever having one end pivoted to said base,
    a first link interconnecting said secondary slide and said lever intermediate its ends,
    and a second link pivoting the other end of said lever to said slide.

12. The blow molding apparatus set forth in claim 11 including shock absorbing means between said cam follower and said secondary slide.

* * * * *